1,833,681

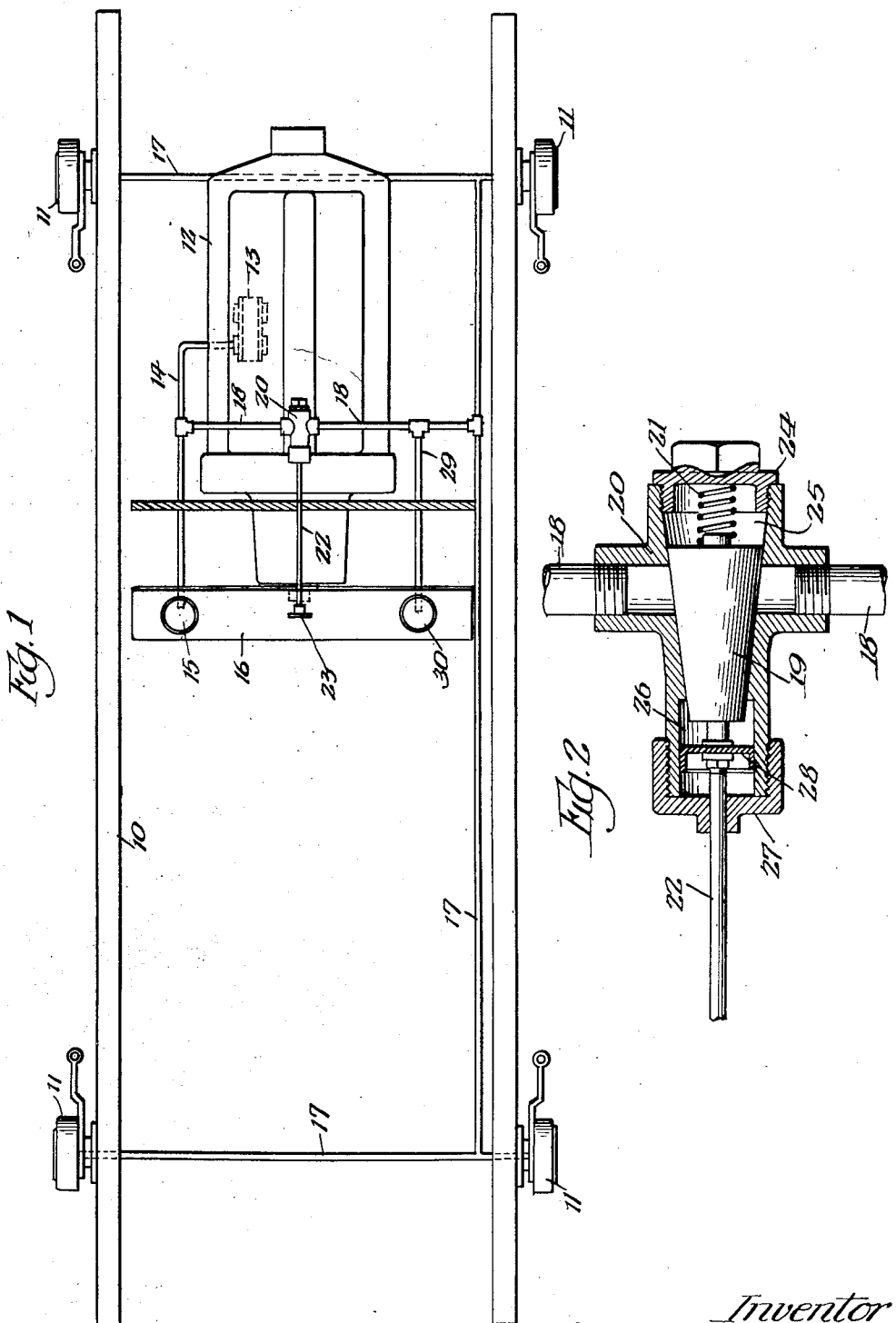
Nov. 24, 1931. E. L. LEINBACH 1,833,681
MEANS FOR EQUALIZING AND CONTROLLING SHOCK ABSORBERS
Filed Jan. 20, 1930
Inventor
Edward L. Leinbach Patented Nov. 24, 1931

UNITED STATES PATENT OFFICE

EDWARD L. LEINBACH, OF CHICAGO, ILLINOIS, ASSIGNOR OF ONE-HALF TO F. G. FLOSI, OF CHICAGO, ILLINOIS; GLADYS LEINBACH EXECUTRIX OF SAID EDWARD L. LEINBACH, DECEASED

MEANS FOR EQUALIZING AND CONTROLLING SHOCK ABSORBERS

Application filed January 20, 1930. Serial No. 422,000.

This invention relates to improvements in equalizing and controlling shock absorbers, and more particularly the type in which fluid is employed as the medium for creating the resistance or friction therein, and one of the objects of the invention is to provide improved means whereby the degree of pressure or resistance in the shock absorbers may be varied at the will of the operator and while the vehicle to which they are attached, is traveling.

A further object is to provide improved means whereby the shock absorbers will be connected with the oiling system of the vehicle and whereby the pressure of the system will be communicated to the shock absorbers, and improved means for controlling at will the flow of the oil in the system.

A further object is to provide improvement means for connecting the shock absorbers with the pressure side of the pump or oil circulating apparatus, and improved means for controlling the circulation pressure of the oil with respect to the shock absorbers from a remote point and from a centralized point upon the vehicle.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention and in which Figure 1 is a diagrammatic view partly in plan and partly in section of a portion of a vehicle having an equalizing and controlling means on the shock absorber constructed in accordance with the principles of this invention.

Figure 2 is an enlarged detail sectional view of a controlling valve.

Referring more particularly to the drawings the numeral 10 designates generally the supporting frame or chassis of a vehicle, and arranged adjacent each wheel thereof is a shock absorber 11 of any desired or suitable construction, the detailed construction of which forms no part of the present invention. Suffice it to say, however, that the resistance or friction creating means in the shock absorber is produced by means of fluid pressure.

The numeral 12 designates an engine or motor upon the vehicle having the usual oil pump 13 which is connected by means of a pipe 14 with an indicator gage 15 located upon the instrument board 16 of the vehicle.

The numeral 17 indicates a pipe line forming a connection between the shock absorbers 11 and 18 designates a pipe which forms communication between the pipe line 17 and the pressure side of the pump 13 or the circulating or distributing means for the lubricating oil of the engine or motor, and is preferably connected to the pipe 14 which leads to the gage 15 so that when the pump 13 is operating the oil will be circulated through the pipe 14, pipe 18 and into the pipe line 17 to be distributed equally to the shock absorbers 11.

In order to control the pressure of the fluid supplied to the shock absorbers there may be provided a valve 19 of any suitable construction which operates in a valve casing 20 arranged preferably in the pipe 18. This valve is preferably of a conical shape and a spring 21 tends normally to move the valve 19 to a position to close or interrupt the passage of the fluid through the pipe 18 to the pipe line 17 and also to prevent its return.

The spring 21 tends normally to close the valve 19 and any suitable means may be provided for opening the valve. A simple and efficient means embodies a stem 22 which is connected with the valve and terminates in a button or handle 23 arranged preferably adjacent the instrument board 16.

The valve casing 20 is preferably provided with a removable closure 24 for a chamber 25, in which latter the spring 21 is arranged and the valve casing is also preferably provided with a chamber 26 at the other end thereof which is closed by a closure 27, through which the stem 22 passes and a packing washer 28 may be provided in the chamber 26 to prevent the escape of the fluid.

Connected with the pipe 18 through the medium of a pipe 29 is an indicator gage 30 preferably arranged on the instrument board 16 and which gage 30 indicates the pressure of the fluid in the shock absorbers.

It is thought that the operation of this device will be clearly understood from the foregoing, but briefly stated it is as follows.

The valve 19 is normally closed.

When the pump 13 is started, and in order to establish an initial pressure in the shock absorbers 11, the valve 19 is opened by pressing the button or handle 23 so that the oil under pressure of the pump will be forced through the pipe 14, pipe 18, into the pipe line 17 until the desired pressure is obtained in the pipe line 17 and the shock absorbers 11. This desired pressure is indicated by the indicator 30. The valve 19 is then closed by the spring 21, after the button or handle 23 is released, thereby maintaining the pressure in the shock absorbers. The continued operation of the pump 13 will cause the oil to be circulated or distributed in the well known manner in the engine and the pressure thereof will be indicated upon the gage 15.

With an average vehicle and when the latter is running between twenty-five and thirty-five miles per hour, it has been found that the pressure indicated upon the gage 15 will usually be approximately thirty pounds, and therefore by opening the valve 19, the pressure of the oiling system will be communicated to the shock absorbers 11 until the desired pressure in the shock absorbers has been obtained and as will be indicated upon the gage 30, after which the valve 19 is closed.

Obviously any desired pressure up to the pressure exerted by the pump upon the oil in the system may be communicated to the shock absorbers by opening the valve 19.

Pressure can be lowered with respect to the shock absorbers when the engine or motor is idling.

It will therefore be manifest that with this construction it is not only possible to procure any desired pressure in the shock absorbers, but by the construction and arrangement of the parts it will be manifest that the pressure may be equalized in all of the shock absorbers by the actuation of the valve 19.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination, a vehicle, shock absorbers connected therewith, a motor, a lubrication circulation system for the motor, means connecting said shock absorbers with the pressure side of the lubrication circulation system, and means for controlling at will the pressure of said system with respect to the shock absorbers.

2. In combination, a vehicle, shock absorbers connected therewith, a motor, a lubrication circulation system for the motor, means connecting said shock absorbers with the pressure side of the lubrication circulation system, and means common to the shock absorbers for controlling at will the pressure of said system with respect to the shock absorbers.

3. In combination, a vehicle, shock absorbers connected therewith, a motor, a lubrication circulation system for the motor, means connecting said shock absorbers with the pressure side of the lubrication circulation system, and means controllable at will for equalizing the pressure in the shock absorbers and for controlling the circulation system with respect to the shock absorbers.

4. In combination, a vehicle, a plurality of shock absorbers connected therewith, a lubrication circulation pump mounted upon the vehicle, means connecting said shock absorbers with the pressure side of said pump, and means for controlling at will the said pressure with respect to the shock absorbers and for equalizing the pressure in said shock absorbers.

5. In combination, a vehicle, a plurality of shock absorbers connected therewith, a source of supply of lubrication fluid, fluid circulation means, means connecting the pressure side of said fluid circulation means with the shock absorbers for supplying fluid pressure to the shock absorbers, and means for controlling the circulation of the fluid to the shock absorbers by the fluid circulation means to vary the fluid pressure in the shock absorbers and for equalizing the pressure in the shock absorbers and to cut off the shock absorbers from the circulation system.

6. In combination, a vehicle, a plurality of shock absorbers connected therewith, a source of supply of lubrication fluid, fluid circulation means, means connecting the pressure side of said fluid circulation means with the shock absorbers for supplying fluid pressure to the shock absorbers, and a single valve mechanism for controlling the circulation of the fluid to the shock absorbers by the fluid circulation means to vary the fluid pressure in the shock absorbers and for equalizing the pressure in the shock absorbers, said valve also operable to disconnect the shock absorbers from the circulation system while the lubrication circulation remains active.

7. In combination, a vehicle, a plurality of shock absorbers connected therewith, a source of supply of lubrication fluid, means for circulating the fluid from said supply to the shock absorbers, a valve mechanism for controlling the circulation of the fluid to the shock absorbers, whereby the pressure in the shock absorbers may be varied and also equalized in all of the shock absorbers, said valve mechanism also operable to cut off the shock absorbers with respect to the circulation system while the lubrication circulation remains active and embodying a valve proper, means tending normally to close the valve, and means for opening the valve at will against the stress of the last said means.

8. In combination, a vehicle, a motor, a circulating lubrication system for the motor, shock absorbers connected with the vehicle, means connecting the shock absorbers with the said lubricating system, and means for controlling the circulation of the lubricating fluid to the shock absorbers for varying and for equalizing the pressure in all of the shock absorbers and for cutting off the shock absorbers with respect to the circulation system while the lubrication circulation remains active.

9. In combination, a vehicle, a motor, a circulating lubrication system for the motor, shock absorbers connected with the vehicle, means connecting the shock absorbers with the pressure side of the said lubricating system, and means for controlling the circulation of the lubricating fluid to the shock absorbers for varying and for equalizing the pressure in all of the shock absorbers and for cutting off the shock absorbers with respect to the circulation system while the lubrication circulation remains active.

10. In combination a vehicle, a motor thereupon, an oil pump for the motor, shock absorbers for the vehicle, means connecting the shock absorbers with the said pump whereby liquid will be circulated to the shock absorbers, and means for controlling at will the circulation of the liquid to the shock absorbers and for cutting off the shock absorbers with respect to said circulation system while the lubrication circulation remains active.

11. In combination, a vehicle, a motor thereupon, an oil pump for the motor, shock absorbers for the vehicle, means connecting the shock absorbers with the said pump whereby liquid will be circulated to the shock absorbers, and means for controlling the circulation of liquid to the shock absorbers to vary and to equalize the pressure in the shock absorbers and for cutting off the shock absorbers with respect to said circulation system while the lubrication circulation remains active.

12. A vehicle, a motor thereupon, a lubrication circulation system associated with the motor, shock absorbers for the vehicle, means for connecting and disconnecting the shock absorbers with and with respect to said system, and means controllable at will for simultaneously varying the pressure in the shock absorbers.

13. A vehicle, a motor thereupon, a lubrication circulation system associated with the motor, shock absorbers for the vehicle, means for connecting and disconnecting the shock absorbers with and with respect to said system, and means controllable at will for simultaneously varying the pressure in the shock absorbers, the last recited means also operating to equalize the fluid pressure in all of the shock absorbers.

14. A vehicle, a motor thereupon, a lubrication circulation system associated with the motor, shock absorbers for the vehicle, means connecting and disconnecting the shock absorbers with and with respect to said system, means controllable at will for simultaneously varying the pressure in the shock absorbers, and means for indicating the fluid pressure in the shock absorbers.

15. A vehicle, a motor thereupon, a lubrication circulation pump associated with said motor, a plurality of shock absorbers, a pipe line connection from the pressure side of said system to the shock absorbers, a valve in said pipe line connection by means of which the fluid pressure in the shock absorbers may be varied or cut off with respect to the lubrication system while the lubrication circulation system remains active at will, and an indicator between said valve and the shock absorbers for indicating the degree of pressure in the shock absorbers.

16. A vehicle, a motor thereupon, a lubrication circulation pump associated with said motor, a plurality of shock absorbers, a pipe line connection from the pressure side of said system to the shock absorbers, a valve in said pipe line connection by means of which the fluid pressure in the shock absorbers may be varied and the shock absorbers may be cut off or connected with the lubrication system at will, while the lubrication circulation system remains active, means tending normally to close said valve, and means operable at the will of the operator to open the valve against the stress of the last said means.

17. In combination, a motor vehicle, a lubricating oil circulation system, shock absorbers, and means connecting said shock absorbers with the pressure side of said system and for cutting off the shock absorbers with respect to the circulating system after a predetermined pressure has been created in the shock absorbers.

18. In combination, a motor vehicle, a lubricating oil circulation system, shock absorbers, means connecting said shock absorbers with the pressure side of said system, whereby oil will be circulated under the pressure of the system to the shock absorbers, and means for controlling the circulation of the oil to the shock absorbers to vary the pressure in the latter and for cutting off the shock-absorbers with respect to the said lubrication circulation system after a predetermined pressure has been obtained in the shock absorbers.

19. In combination, a motor vehicle, a lubricating oil circulation system, shock absorbers, means connecting said shock absorbers with the pressure side of said system, whereby oil will be circulated under the pressure of the system to the shock absorbers, and means for controlling the circulation of the oil to the shock absorbers to vary the pressure in the latter and for cutting off the shock absorbers from the circulation system after a predetermined pressure has been obtained in the shock absorbers, the last said means also serving to equalize the pressure in all of the shock absorbers.

20. In combination, a vehicle, shock absorbers connected therewith, a source of supply of lubrication fluid, lubrication circulating means, a pipe line connection between the shock absorbers and the pressure side of the lubrication circulation means, valve mechanism in said pipe line connection whereby said pipe line may be opened to permit circulation of the lubricating fluid to the shock absorbers and closed to cut off the circulation of the lubrication to the shock absorbers, while the lubrication circulation system remains active, and means for controlling at will the opening and closing of the said valve, the said valve being also operable to equalize and vary the pressure in the shock absorbers.

21. In combination, a motor vehicle, shock absorbers connected therewith, a common source of lubrication for the motor and for supplying fluid to the shock absorbers, a lubrication circulation pump for the motor, a pipe line connection between the shock absorbers and the pressure side of said pump whereby said pump will simultaneously circulate the lubrication fluid to the motor and to the shock absorbers to create pressure in the latter, and means whereby when a predetermined fluid pressure has been created in the shock absorbers further supply of lubrication fluid thereto will be cut off while the remaining portion of the lubrication fluid will be circulated by said pump to the engine.

22. In combination, a motor vehicle, shock absorbers connected therewith, a common source of lubrication for the motor and for supplying fluid to the shock absorbers, a lubrication circulation pump for the motor, a pipe line connection between the shock absorbers and the pressure side of said pump whereby said pump will simultaneously circulate the lubrication fluid to the motor and to the shock absorbers to create pressure in the latter, means whereby when a predetermined fluid pressure has been created in the shock absorbers further supply of lubrication fluid thereto will be cut off while the remaining portion of the lubrication fluid will be circulated by said pump to the engine, the said means embodying a valve in said pipe line, and means for controlling the operation of the valve from a remote point in the vehicle.

In testimony whereof I have signed my name to this specification, on this 13th day of January, A. D. 1930.

EDWARD L. LEINBACH.